US012222952B2

(12) United States Patent
Kodama et al.

(10) Patent No.: US 12,222,952 B2
(45) Date of Patent: Feb. 11, 2025

(54) INFORMATION PROCESSING SYSTEM AND LOG STORAGE METHOD FOR INFORMATION PROCESSING SYSTEM

(71) Applicant: Hitachi, Ltd., Tokyo (JP)

(72) Inventors: Tomoyuki Kodama, Tokyo (JP); Mitsuo Hayasaka, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/586,634

(22) Filed: Feb. 26, 2024

(65) Prior Publication Data

US 2024/0411768 A1 Dec. 12, 2024

(30) Foreign Application Priority Data

Jun. 9, 2023 (JP) ................................. 2023-095786

(51) Int. Cl.
| | | |
|---|---|---|
| *G06F 16/00* | (2019.01) | |
| *G06F 16/2458* | (2019.01) | |
| *G06F 16/27* | (2019.01) | |
| *G06F 21/31* | (2013.01) | |

(52) U.S. Cl.
CPC .......... *G06F 16/2471* (2019.01); *G06F 16/27* (2019.01); *G06F 21/31* (2013.01)

(58) Field of Classification Search
CPC ....... G06F 16/2471; G06F 16/27; G06F 21/31
See application file for complete search history.

(56) References Cited

U.S. PATENT DOCUMENTS

| | | | | |
|---|---|---|---|---|
| 6,742,015 B1* | 5/2004 | Bowman-Amuah | ..... | G06F 8/20 |
| | | | | 718/100 |
| 7,362,868 B2* | 4/2008 | Madoukh | .............. | H04L 63/045 |
| | | | | 713/165 |
| 9,313,254 B2* | 4/2016 | Ogura | .................... | H04L 67/142 |
| 10,284,565 B2* | 5/2019 | Wu | ........................ | H04L 9/3271 |
| 12,130,945 B2* | 10/2024 | Bobde | ................ | G06F 21/6254 |

(Continued)

FOREIGN PATENT DOCUMENTS

| | | | | |
|---|---|---|---|---|
| CN | 114389894 A | * | 4/2022 | ............. H04L 63/10 |
| JP | 2009-151560 A | | 7/2009 | |

*Primary Examiner* — Noosha Arjomandi (74) *Attorney, Agent, or Firm* — MATTINGLY & MALUR, PC (57) ABSTRACT

When a cooperation source user name corresponding to identification information of a user included in a received request is included in a cooperation destination system user information, a cooperation destination system converts the identification information of the user included in the request into a user ID corresponding to the cooperation source user name in a cooperation destination system user information. The cooperation destination system processes the request based on the user ID and determines whether or not a cooperation source user name corresponding to the user ID is included in the cooperation destination system user information. In a case where the cooperation source user name corresponding to the user ID is included in the cooperation destination system user information, the cooperation destination system converts the user ID into a cooperation source user name corresponding to the user ID in the cooperation destination system user information.

6 Claims, 10 Drawing Sheets

(56) References Cited

U.S. PATENT DOCUMENTS

| | | | |
|---|---|---|---|
| 2002/0093527 A1* | 7/2002 | Sherlock | H04L 63/1433 |
| | | | 715/736 |
| 2008/0077752 A1* | 3/2008 | Kinoshita | G06F 11/0787 |
| | | | 711/154 |
| 2009/0165011 A1 | 6/2009 | Kato et al. | |
| 2012/0294307 A1* | 11/2012 | Fujihira | H04L 45/50 |
| | | | 370/389 |
| 2012/0296876 A1* | 11/2012 | Bacinschi | G06F 21/629 |
| | | | 707/687 |
| 2015/0092222 A1* | 4/2015 | Yasukawa | H04L 63/205 |
| | | | 358/1.14 |
| 2015/0324579 A1* | 11/2015 | Qian | G06F 21/45 |
| | | | 726/6 |
| 2016/0080502 A1* | 3/2016 | Yadav | H04L 45/125 |
| | | | 709/227 |
| 2016/0171205 A1* | 6/2016 | Bauer | G06F 9/542 |
| | | | 726/26 |
| 2017/0187726 A1* | 6/2017 | Turakhia | H04L 67/125 |
| 2018/0359248 A1* | 12/2018 | Dwarkaprasad | G06F 16/955 |
| 2019/0097993 A1* | 3/2019 | Iwashita | H04L 63/083 |
| 2020/0259836 A1* | 8/2020 | Kumar | G06F 21/6209 |
| 2022/0129541 A1* | 4/2022 | Scrivano | G06F 9/545 |
| 2022/0173995 A1* | 6/2022 | Takase | H04L 45/02 |
| 2023/0195880 A1* | 6/2023 | Cambou | G06F 21/46 |
| | | | 726/18 |
| 2024/0045977 A1* | 2/2024 | Kimura | G06F 21/604 |
| 2024/0056450 A1* | 2/2024 | Cernoch | H04L 63/10 |
| 2024/0098203 A1* | 3/2024 | Seo | H04N 1/32496 |

\* cited by examiner

| USER ID 401 | COOPERATION FLAG 402 | COOPERATION SOURCE USER NAME 403 | ... |
|---|---|---|---|
| abcdefgh | Yes | taro.suzuki | ... |
| jiro.ito | No | NULL | ... |
| ... | ... | ... | ... |

| DATE AND TIME | USER NAME | OPERATION SOURCE COOPERATION SOURCE SYSTEM | OPERATION CONTENT | OPERATION RESULT | ... |
|---|---|---|---|---|---|
| 2023/02/07 12:23:45 | taro.Suzuki (abcdefgh) | Local | AAAA | Success | ... |
| 2023/02/07 13:45:00 | jiro.ito | ... | BBBB | Fail | ... |
| ... | ... | ... | ... | ... | ... |

| USER ID | COOPERATION FLAG | COOPERATION SOURCE USER NAME | ... |
|---|---|---|---|
| abcdefgh1 | Yes:SYSID1 | taro.suzuki | ... |
| abcdefgh2 | Yes:SYSID2 | Saburo.tanaka | ... |
| jiro.ito | No | NULL | ... |
| ... | ... | ... | ... |

INFORMATION PROCESSING SYSTEM AND LOG STORAGE METHOD FOR INFORMATION PROCESSING SYSTEM

CROSS-REFERENCE TO RELATED APPLICATION

The present application claims priority from Japanese application JP2023-095786, filed on Jun. 9, 2023, the content of which is hereby incorporated by reference into this application.

BACKGROUND OF THE INVENTION

1. Field of the Invention

The present invention relates to an information processing system and a log storage method for the information processing system.

2. Description of the Related Art

An audit log is used as one type of information for proving and confirming that an operation of an information system is compliant with laws and regulations, security evaluation criteria, and the like.

In recent years, in addition to a method for directly managing a system such as a server or a storage, a service for managing the system via a cloud service has appeared. In a case where the server or the storage is operated from such a cloud service, the server or the storage also stores the operation in the audit log.

When such cooperation with the cloud service increases, the number of users increases, a user name of a user who operates from the cloud service overlaps with a user name of a user who directly operates the server or the storage, and it is not possible to know which user has performed the operation even by viewing the audit log.

As a method for managing names such as user names having a probability of collision so as not to overlap, there is a method using a universally unique identifier (UUID). For example, in JP 2009-151560 A, by using a UUID to identify a server, the server can be managed while avoiding overlapping.

SUMMARY OF THE INVENTION

At the time of cooperation between systems, by using, as a user name, unique identification information such as a UUID, it is possible to avoid overlapping between user names and enable cooperation.

However, when unique identification information such as a UUID is output to an audit log that needs to be confirmed by a person, it is necessary to cause a person to match the unique identification information such as the UUID with the user. This matching work is very complicated.

The present invention has been made in view of the above circumstances, and an object of the present invention is to generate a log enabled to be confirmed without matching of users, while avoiding overlapping of user names between systems.

To solve the above problems, according to an aspect, there is provided an information processing system that cooperates with a cooperation source system to process a request received via the cooperation source system and a request received directly without the cooperation source system. The information processing system includes a processor, and a storage unit, in which the storage unit stores user information for managing user identification information for uniquely identifying a user in the information processing system and cooperation source user identification information for identifying a cooperation source user in the cooperation source system in a case where the user is the cooperation source user, in association with each other, and the processor is configured to receive the request, determine whether or not the cooperation source user identification information corresponding to identification information of a user included in the received request is included in the user information, convert the identification information into user identification information corresponding to the cooperation source user identification information in the user information, in a case where the cooperation source user identification information is included in the user information, process the request based on the user identification information, determine whether or not the cooperation source user identification information corresponding to the user identification information is included in the user information, when a log related to processing on the request is output, convert the user identification information into the cooperation source user identification information corresponding to the user identification information in the user information in a case where the cooperation source user identification information corresponding to the user identification information is included in the user information, and output the log including the cooperation source user identification information converted from the user identification information.

According to the present invention, it is possible to store an operation performed by a cooperation source system in an audit log of a cooperation destination system with a user name of the cooperation source system, while avoiding overlapping of user names between the systems. As a result, it is possible to confirm the audit log without matching between the UUID and the user.

DESCRIPTION OF THE PREFERRED EMBODIMENTS

Embodiments will be described with reference to the drawings. The embodiments described below do not limit the invention according to the claims, and all the elements and combinations described in the embodiments are not necessarily essential for the solution of the invention.

In the following description, a program for realizing each processing functional unit is executed by a processor (for example, a central processing unit (CPU)), thereby performing predetermined processing by appropriately using a storage resource (for example, a memory) and/or a communication interface device (for example, a port). Therefore, the processing performed by each processing functional unit may be processing performed by a processor or a computer having the processor.

In the following description, various types of information are represented in a table format, but the information is not limited to the table format, and may be represented in a format of comma separated values (CSV) or other formats. Since the various types of information do not depend on a data format, for example, an "XXX table" can be referred to as "XXX information".

In addition, names such as "identification information", "ID", and "name" of items including, in item names, information for distinguishing a corresponding record from other records among items in various types of information may be replaced with each other. For example, a "user ID" may be replaced with "user identification information".

First Embodiment

Configuration of Cooperation System S According to First Embodiment

Figure 1:
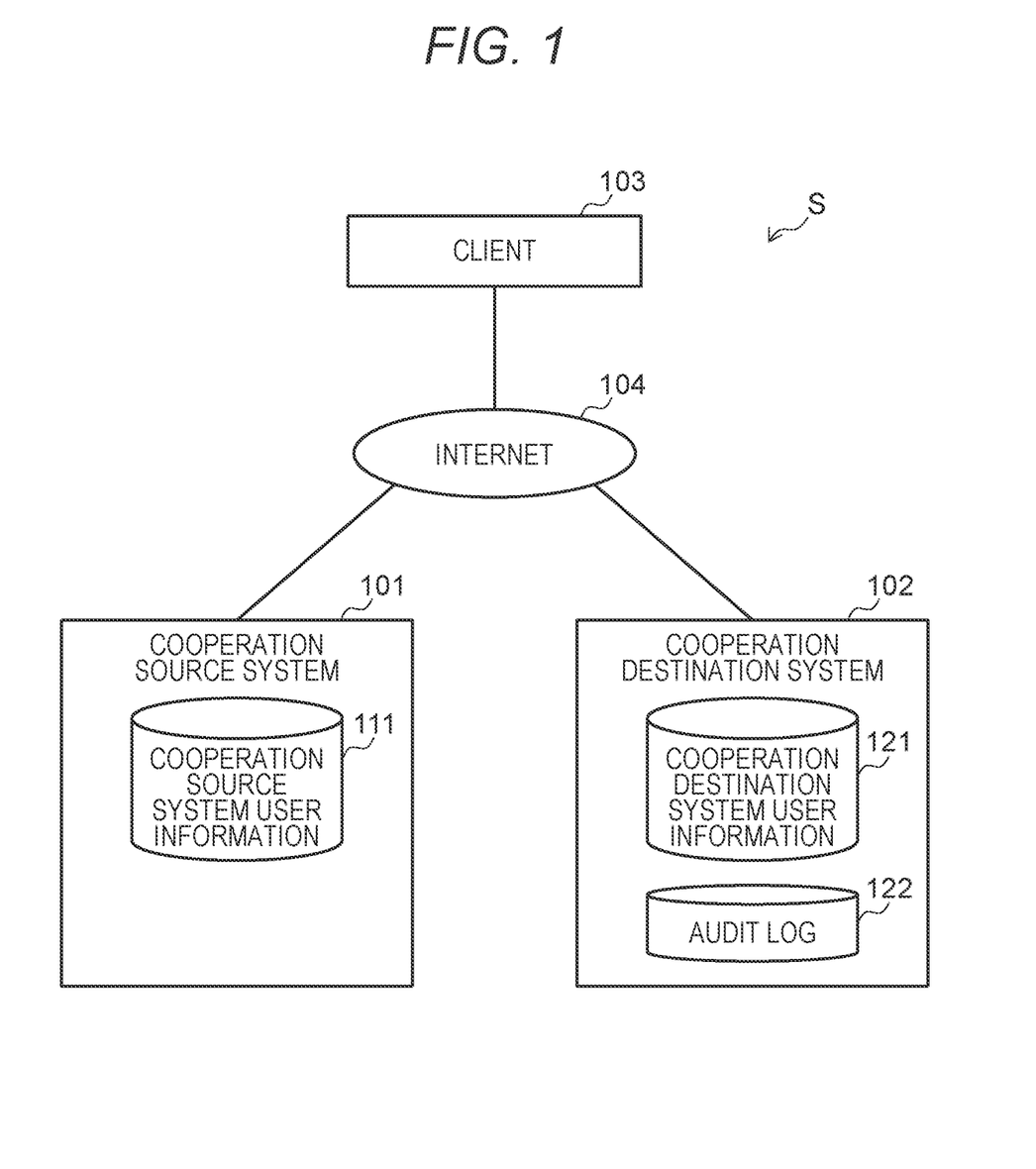
FIG. 1 is a block diagram illustrating an example of a schematic configuration of a cooperation system according to a first embodiment.

FIG. 1 is a block diagram illustrating an example of a schematic configuration of a cooperation system S according to a first embodiment.

In FIG. 1, the cooperation system S includes a cooperation source system 101, a cooperation destination system 102, a client 103, and the Internet 104 that connects the systems.

The cooperation source system 101 is connected to the cooperation destination system 102 and the client 103. A user operates the client 103 to perform connection to the cooperation source system 101 via the Internet 104. The operation performed on the cooperation source system 101 is transferred to the cooperation destination system 102 via the Internet 104 as necessary and processed.

The client 103 is not limited to a terminal that is connected to the cooperation source system 101 by an operation of the user and transfers a request to the cooperation destination system 102. That is, the client 103 also includes a terminal that is connected to the cooperation destination system 102 by the operation of the user and directly transmits a request to the cooperation destination system 102.

The cooperation source system 101 retains cooperation source system user information 111 for authorizing authentication of a user who accesses a provided service.

In the cooperation destination system 102, an operation from the cooperation source system 101 via the Internet 104 and an operation of directly accessing the cooperation destination system 102 are possible.

The cooperation destination system 102 retains cooperation destination system user information 121 for authorizing authentication of a user who performs an operation. The cooperation destination system 102 further includes an audit log 122 for storing a record of an operation by the user.

The client 103 is a system as an interface for a user to perform connection to the cooperation source system 101 via the Internet 104 and use the cooperation source system 101. Specifically, the client 103 is a computer, a smartphone, and a web browser or an application that operate on the computer or the smartphone.

The Internet 104 is a network that interconnects the cooperation source system 101, the cooperation destination system 102, and the client 103. The Internet 104 may be replaced with any network such as a local area network (LAN).

Figure 2:
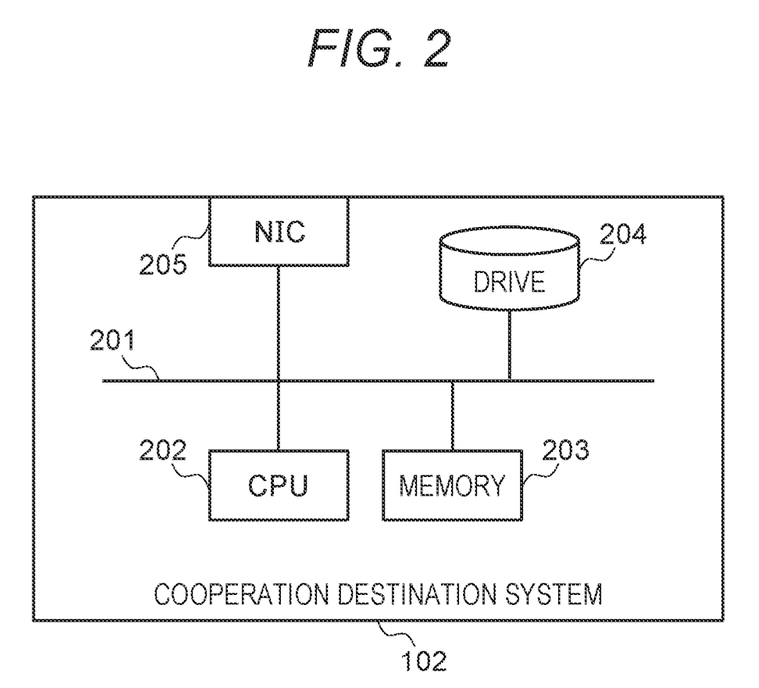
FIG. 2 is a block diagram illustrating an example of a hardware configuration of a cooperation destination system according to the first embodiment.

Hardware Configuration of Cooperation Destination System 102 According to First Embodiment FIG. 2 is a block diagram illustrating an example of a hardware configuration of the cooperation destination system 102 according to the first embodiment.

In FIG. 2, the cooperation destination system 102 is configured to include a central processing unit (CPU) 202, a memory 203, a drive 204, and a network interface card (NIC) 205. The CPU 202, the memory 203, the drive 204, and the NIC 205 are connected to each other via a bus 201.

The memory 203 is a main storage device that can be read and written by the CPU 202. The memory 203 is, for example, a semiconductor memory such as an SRAM or a DRAM. The memory 203 can store a program being executed by the CPU 202 or provide a work area for the CPU 202 to execute the program.

The drive 204 is a secondary storage device that can be read and written by the CPU 202. The drive 204 is, for example, a hard disk device or a solid state drive (SSD). The drive 204 can retain execution files of various programs and data or user information used for executing the programs. The drive 204 may include a plurality of hard disk devices or SSDs using a redundant arrays of independent disks (RAID) technology or the like.

The CPU 202 reads a program stored on the drive 204 into the memory 203 and executes the program. The CPU 202 is connected to the NIC 205 via the bus 201, and can communicate with the cooperation source system 101 via the Internet 104.

The cooperation destination system 102 may include a plurality of systems using a clustering technology or the like.

Figure 3:
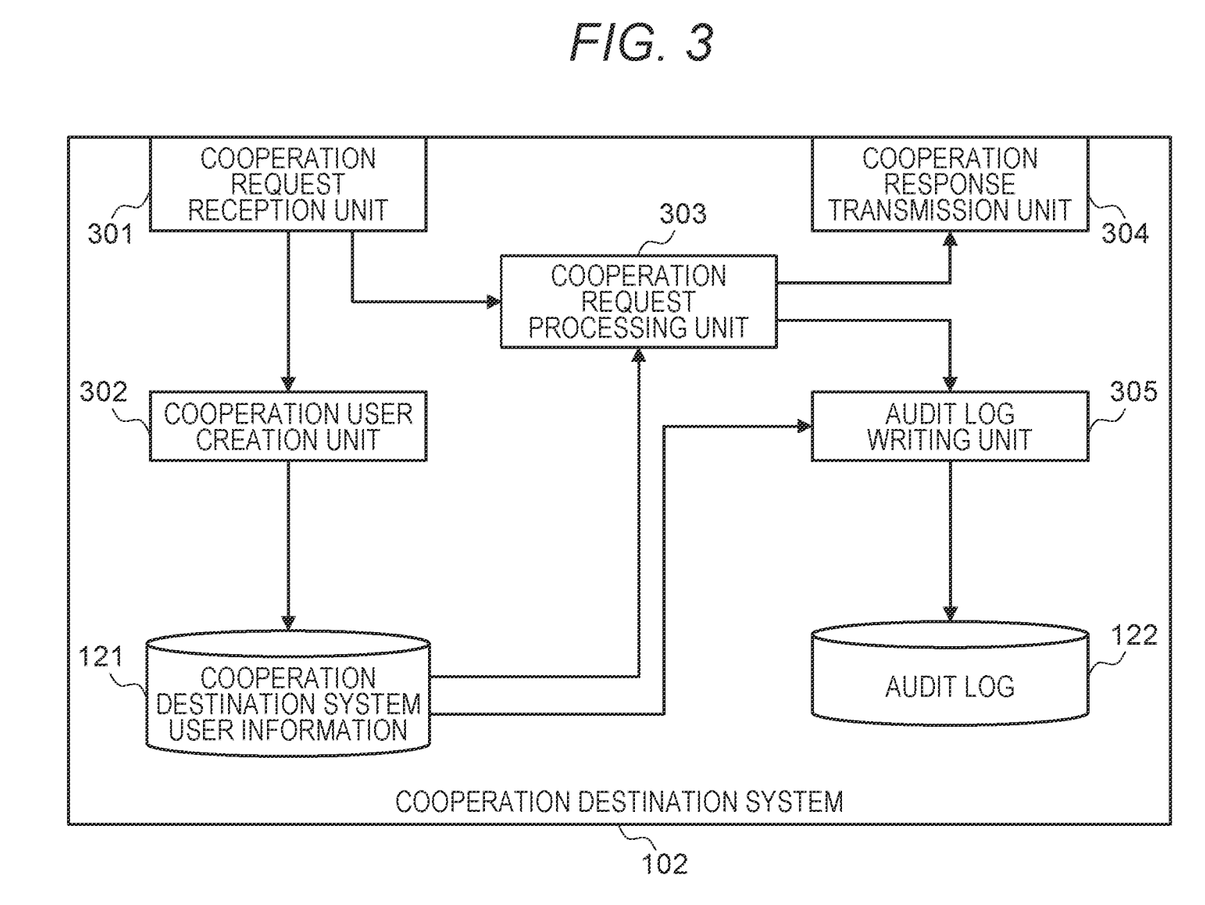
FIG. 3 is a block diagram illustrating an example of a functional configuration of the cooperation destination system according to the first embodiment.

Functional Configuration of Cooperation Destination System 102 According to First Embodiment FIG. 3 is a block diagram illustrating an example of a functional configuration of the cooperation destination system 102 according to the first embodiment. The cooperation destination system 102 is, for example, a storage system, but is not limited thereto. The cooperation destination system 102 may be any information processing system that receives a request from a user terminal via another system or directly from the user terminal, processes the request, and outputs a log related to processing. The log is, for example, an audit log, but is not limited thereto. The log may be any log that stores a processing result of a request.

In FIG. 3, the cooperation destination system 102 is configured to include a cooperation request reception unit 301 that receives an operation request from the cooperation source system 101 via the Internet 104, and a cooperation request processing unit 303 that processes the received operation request. The cooperation destination system 102 is configured to further include a cooperation response transmission unit 304 that transmits, as a response, a processing result of the operation request to the cooperation source system 101 via the Internet 104.

The cooperation destination system 102 further includes a cooperation user creation unit 302 that creates a user (cooperation user) who operates the cooperation source system 101 in the cooperation destination system 102, and cooperation destination system user information 121 that stores user information of the cooperation user and a normal user. The normal user is a user who directly operates the cooperation destination system 102 from the client 103. The cooperation destination system user information 121 is stored in a predetermined storage unit.

The cooperation destination system 102 further includes an audit log 122 that stores an audit log, and an audit log writing unit 305 that writes an operation of the cooperation request processing unit 303 to the audit log 122.

A gateway, a firewall, or the like may be provided between the cooperation request reception unit 301 and the cooperation response transmission unit 304, and the Internet 104. The audit log 122 may be transferred to an external log data accumulation server (such as a syslog).

Figure 4:
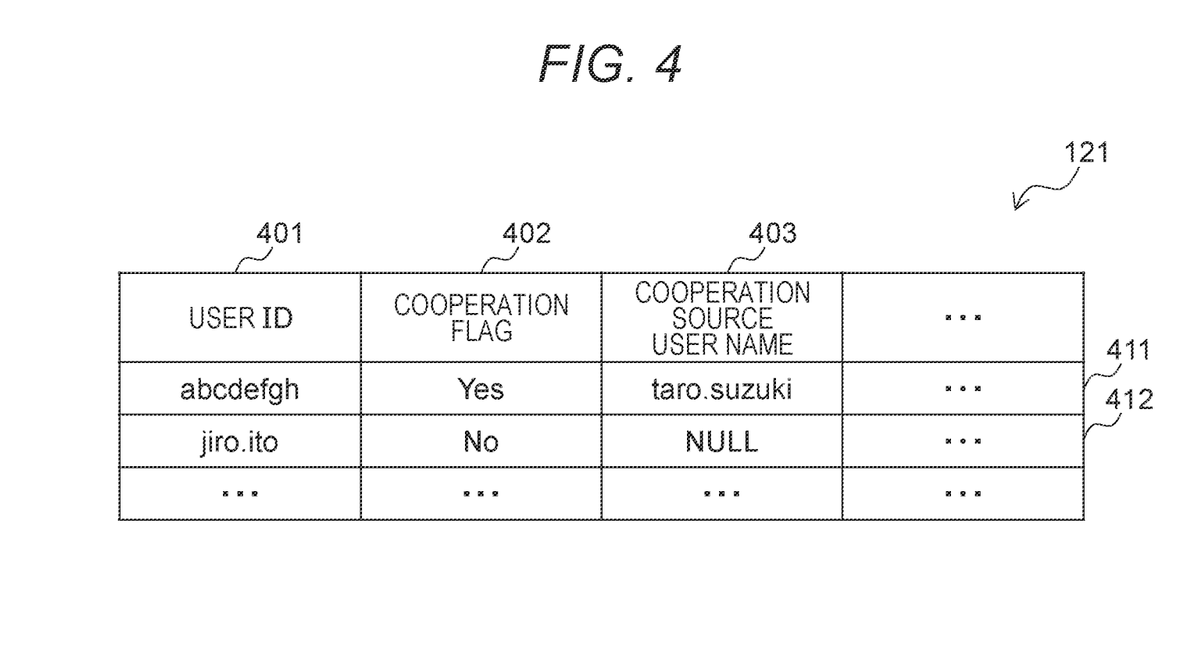
FIG. 4 is a diagram illustrating a configuration of cooperation destination system user information retained by the cooperation destination system according to the first embodiment.

Configuration of Cooperation Destination System User Information 121 According to First Embodiment FIG. 4 is a diagram illustrating a configuration of cooperation destination system user information 121 retained by the cooperation destination system 102 according to the first embodiment.

The cooperation destination system user information 121 is used to manage a user (cooperation user) used at the time of cooperation with the cooperation source system 101 and a normal user of the cooperation destination system 102.

The cooperation destination system user information 121 is managed as information including a user ID 401 for identifying a user, a cooperation flag 402 indicating that the user is a user for cooperation with the cooperation source system 101, and a cooperation source user name 403 indicating a user name in the cooperation source system. The cooperation destination system user information 121 may have other types of information. The cooperation source user name 403 is an example of cooperation source user identification information.

A record 411 is an example of the cooperation user. In the record 411, the user ID 401 is a UUID, the cooperation flag 402 is Yes (the user is a user for cooperation), and the cooperation source user name 403 is a user name used in the cooperation source system 101. On the other hand, a record 412 is a normal user used in the cooperation destination system 102. In this case, the user ID 401 is a character string such as a name, the cooperation flag 402 is No (the user is not a user for cooperation), and the cooperation source user name 403 is NULL.

Figure 5:
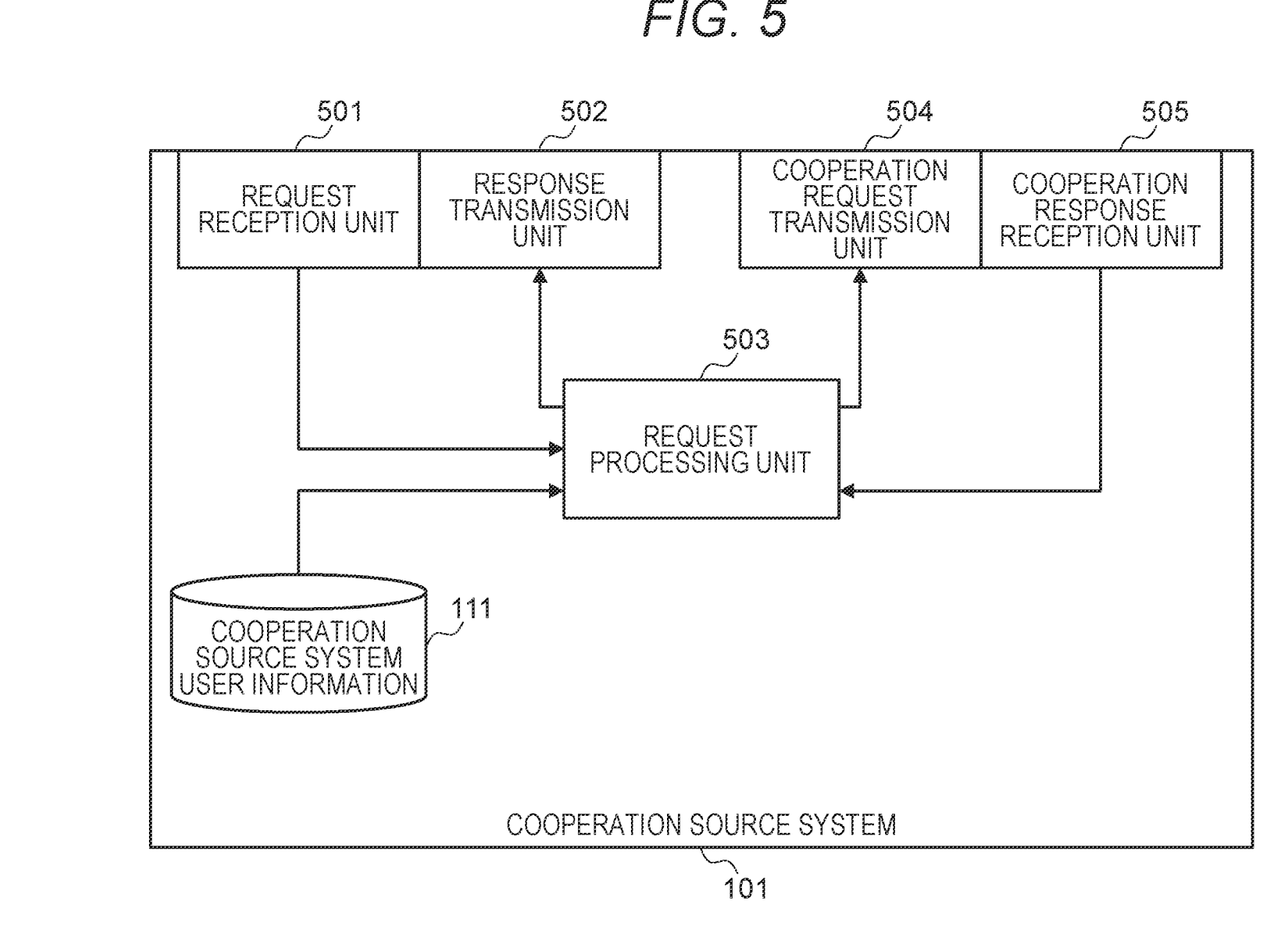
FIG. 5 is a block diagram illustrating an example of a functional configuration of a cooperation source system according to the first embodiment.

Functional Configuration of Cooperation Source System 101 According to First Embodiment FIG. 5 is a block diagram illustrating an example of a functional configuration of the cooperation source system 101 according to the first embodiment.

In FIG. 5, the cooperation source system 101 is configured to include a request reception unit 501, a response transmission unit 502, a cooperation request transmission unit 504, a cooperation response reception unit 505, and a request processing unit 503.

The request reception unit 501 receives an operation request from the client 103 via the Internet 104. The response transmission unit 502 transmits, as a response, a processing result of the operation request to the client 103 via the Internet 104. The cooperation request transmission unit 504 transmits an operation request to the cooperation destination system 102 via the Internet 104. The cooperation response reception unit 505 receives a result of the operation request from the cooperation destination system 102 via the Internet 104. The request processing unit 503 transmits the operation request received by the request reception unit 501, from the cooperation request transmission unit 504 to the cooperation destination system 102 via the Internet 104. The request processing unit 503 causes the cooperation response reception unit 505 to receive a transmission result of the operation request via the Internet 104, and transmits, as a response, the transmission result of the operation request from the response transmission unit 502 to the client 103 via the Internet 104.

A gateway, a firewall, or the like may be provided between the request reception unit 501, the response transmission unit 502, the cooperation request transmission unit 504, and the cooperation response reception unit 505, and the Internet 104.

Figure 6:
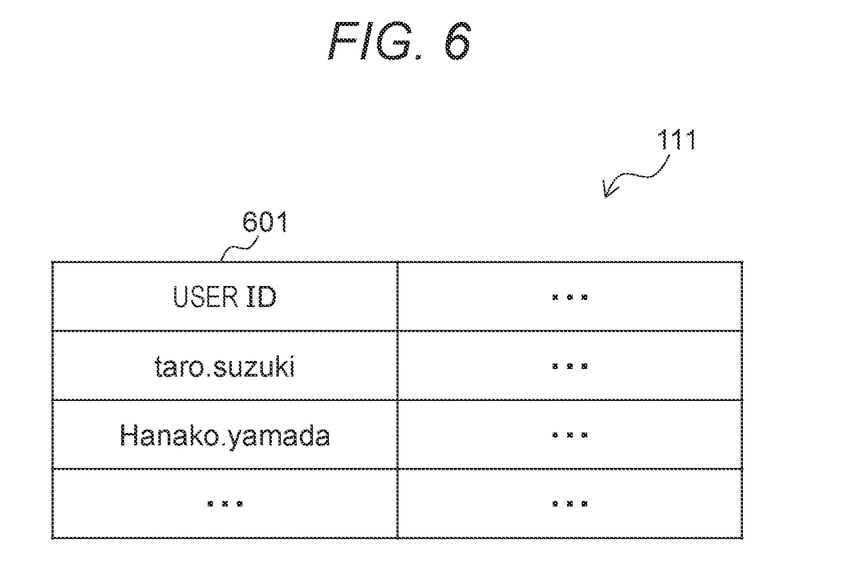
FIG. 6 is a diagram illustrating a configuration of cooperation source system user information retained by the cooperation source system according to the first embodiment.

Configuration of Cooperation Source System User Information 111 According to First Embodiment FIG. 6 is a diagram illustrating a configuration of cooperation source system user information 111 retained by the cooperation source system 101 according to the first embodiment.

The cooperation source system user information 111 is used to manage a user who uses the cooperation source system 101. In the cooperation source system user information 111, each user is managed as information including a user ID 601 for identifying the user. The cooperation source system user information 111 may have other types of information.

Request Processing of Cooperation System S According to First Embodiment

Figure 7:
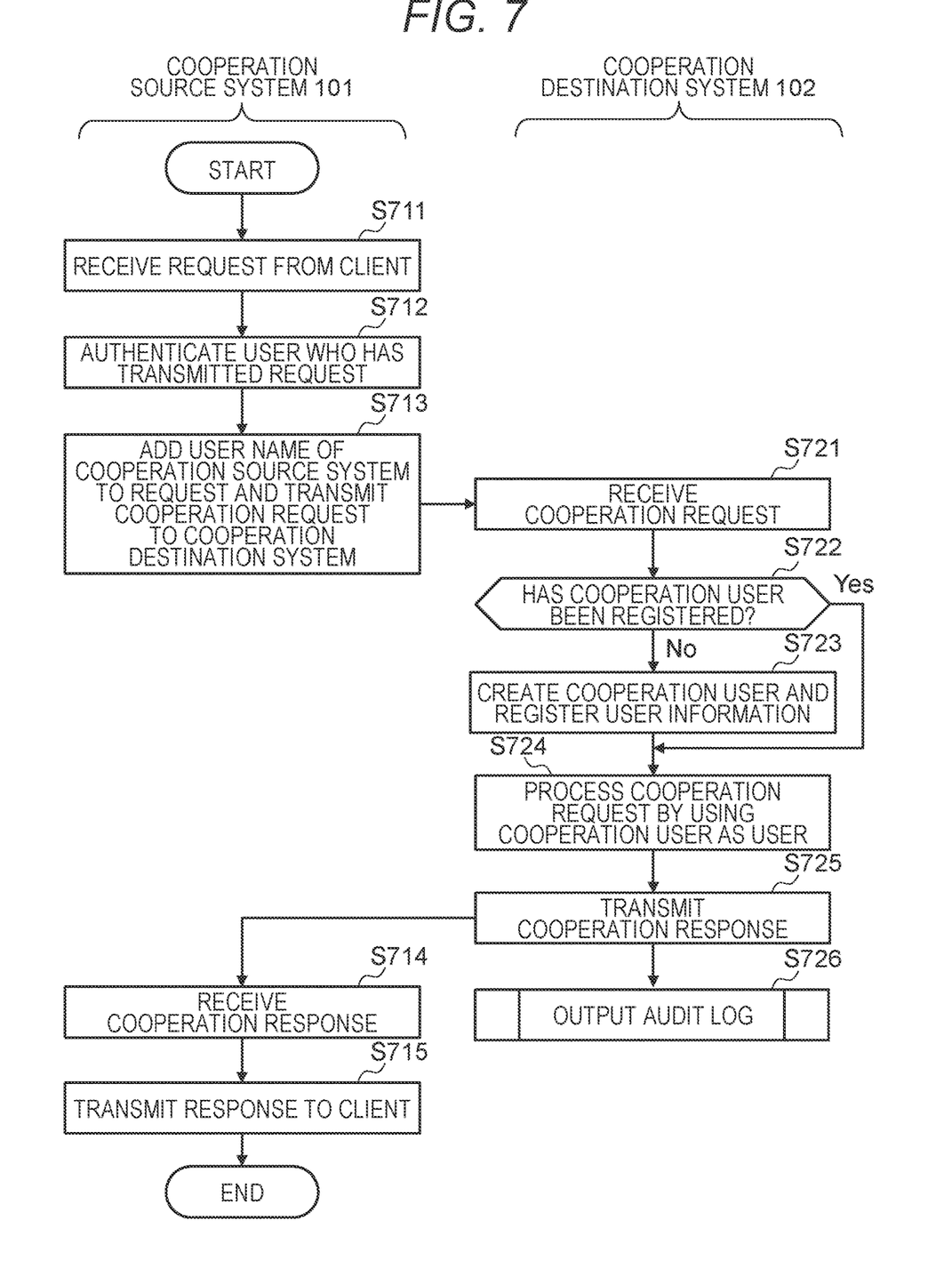
FIG. 7 is a flowchart illustrating request processing of the cooperation system according to the first embodiment.

FIG. 7 is a flowchart illustrating request processing of the cooperation system S according to the first embodiment. The request processing is started when the cooperation source system 101 receives a request from the client 103.

First, the cooperation source system 101 receives a request from the client 103 via the Internet 104 (S711). Then, the cooperation source system 101 refers to the cooperation source system user information 111 based on the received request, and authenticates a user who has transmitted the request by using an ID, a password, and the like (S712). As an authentication method used at this time, public key authentication or the like may be used. Then, after the authentication of the user has been completed, the cooperation source system 101 adds a user name of the user authenticated and operated by the cooperation source system 101 to the request, and transmits a cooperation request to the cooperation destination system 102 (S713). The information added in S713 may include information other than the user name, for example, an ID of the cooperation source system.

Then, the cooperation destination system 102 receives the cooperation request transmitted from the cooperation source system 101 via the Internet 104 (S721). The cooperation destination system 102 confirms whether a cooperation user for the user is registered in the cooperation destination system user information 121 from the user name of the cooperation source system 101 included in the cooperation request (S722). In a case where the cooperation user is not registered (No in S722), the cooperation destination system 102 creates the cooperation user (S723) and registers the cooperation user in the cooperation destination system user information 121 (S723). At this time, a UUID is used as the user ID 401 so as not to overlap other users. The cooperation flag 402 is Yes, and the user name in the cooperation source system 101 included in the cooperation request is stored in the cooperation source user name 403.

The cooperation flag 402 only needs to be able to identify that the user is a user created for cooperation with the cooperation source system 101, and does not necessarily need to be Yes. The fact that the cooperation source user name 403 is not "NULL" may be substituted for the fact that the cooperation flag 402 is Yes.

In a case where the cooperation user has been registered (Yes in S722) or after the cooperation user has been registered in S723, the cooperation destination system 102 processes the cooperation request as an operation of the cooperation destination system 102 by the cooperation user (S724). After completion of the process of S724, the cooperation destination system 102 transmits the processing result to the cooperation source system 101 as a cooperation response (S725). The result is output as an audit log (S726). The output of the audit log in S726 will be described later with reference to FIGS. 8 and 9.

Then, the cooperation source system 101 receives the cooperation response from the cooperation destination system 102 (S714). Thereafter, the cooperation source system 101 transmits a response based on the received cooperation response, to the client 103 via the Internet 104 (S715). The above flow is repeatedly performed every time the client 103 transmits a request to the cooperation source system 101 via the Internet 104.

In the request processing of the cooperation system S illustrated in FIG. 7, it is assumed that the request received by the cooperation destination system 102 is a request received via the cooperation source system 101. However, the request received by the cooperation destination system 102 includes a request directly transmitted from the client 103. Thus, the request includes identification information of a request source system. In a case where identification information of the request source system included in the received request corresponds to the cooperation source system 101, the cooperation destination system 102 executes the processes of S722 and S723. On the other hand, in a case where the identification information included in the received request does not correspond to the identification information of the cooperation source system 101 (the user is a user of the cooperation destination system 102 or the like), S722 and S723 are omitted, and the request is processed based on a user ID included in the request received in S724.

Example of Audit Log 122 According to First Embodiment

Figure 8:
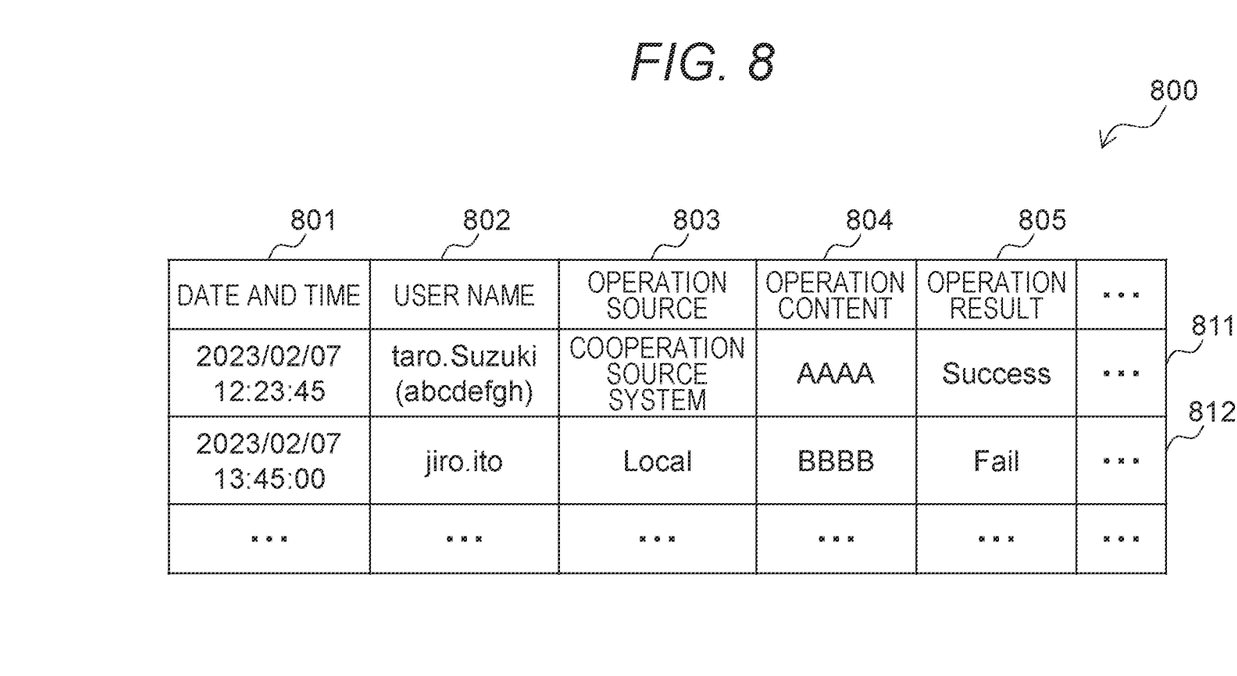
FIG. 8 illustrates an example of an audit log output by an audit log writing unit in the cooperation destination system according to the first embodiment in a form of a table.

FIG. 8 illustrates an example of the audit log 122 output by the audit log writing unit 305 in the cooperation destination system 102 according to the first embodiment in a form of a table.

An audit log 800 output by the audit log writing unit 305 may not be table data, and may be text data using a delimiter such as ", (comma)" in a CSV format.

The audit log 800 includes a date and time 801, a user name 802, an operation source 803, an operation content 804, an operation result 805, and the like. The arrangement order of the above items may be interchanged. Some of the items may not be provided, or additional items may be provided.

In the example illustrated in FIG. 8, in a record 811, "abcdefgh" of a user name 802 of the cooperation destination system 102 is converted into "taro. Suzuki" of the user name 802 of the cooperation source system 101 and then is output. In the record 812, since the user name "jiro.ito" of the cooperation destination system 102 is a user unique to the cooperation destination system 102, the user name 802 is not converted, and the user name "jiro.ito" of the cooperation destination system 102 is directly output.

Figure 9:
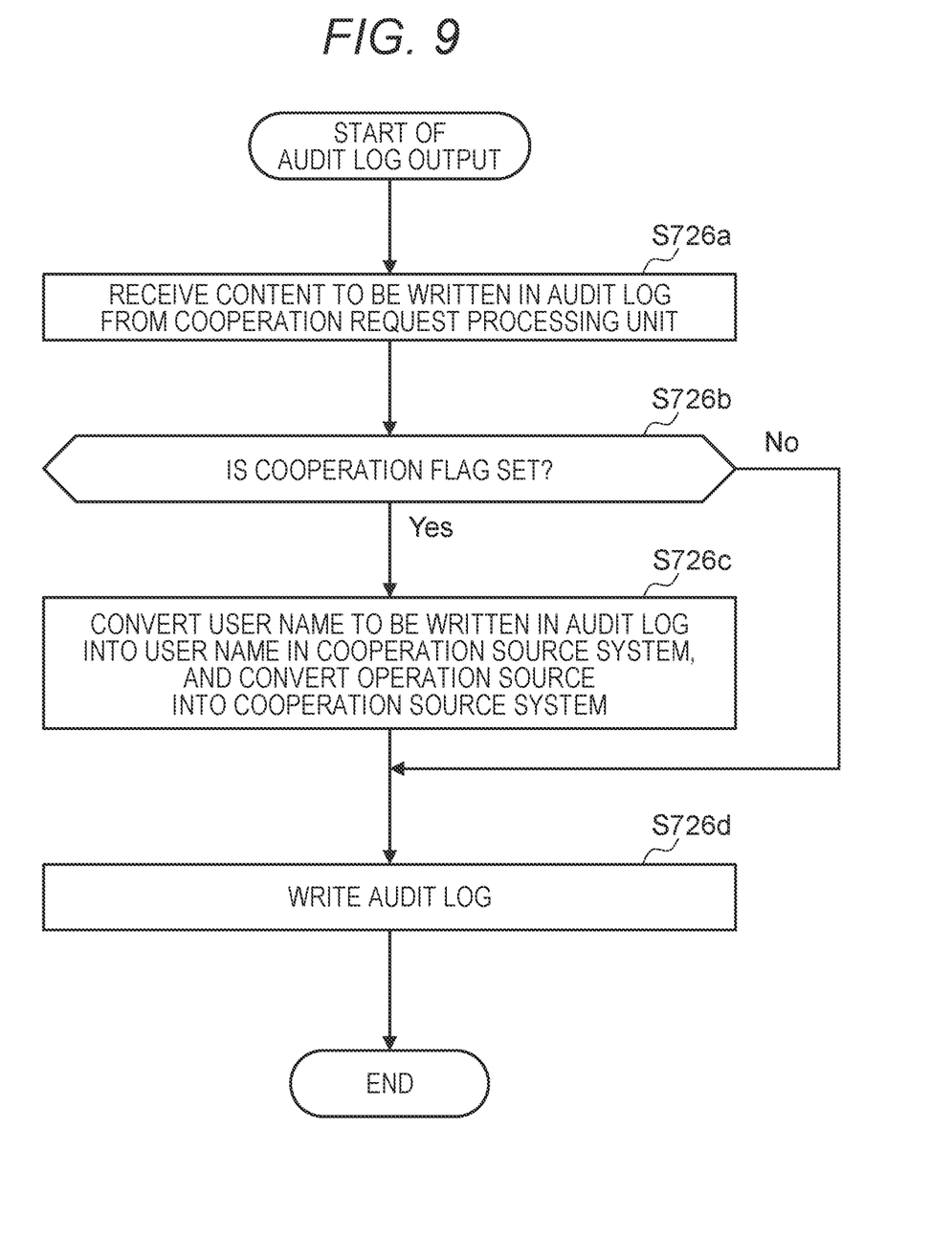
FIG. 9 is a flowchart illustrating processing performed by the audit log writing unit in the cooperation destination system according to the first embodiment.

Processing Performed by Audit Log Writing Unit 305 According to First Embodiment FIG. 9 is a flowchart illustrating processing performed by the audit log writing unit 305 in the cooperation destination system 102 according to the first embodiment. FIG. 9 illustrates a flow of detailing S726 of FIG. 7.

First, the audit log writing unit 305 receives the content to be written to the audit log 800 from the cooperation request processing unit 303 (S726a).

Then, when the content to be written to the audit log 800 is received, the audit log writing unit 305 searches the cooperation destination system user information 121 of the cooperation destination system 102 for a user name of a user who has performed the operation, and finds a user having a user name that coincides with the user ID 401. The audit log writing unit 305 checks the cooperation flag 402 of the cooperation destination system user information 121 for the found user (S726b). In a case where the cooperation flag 402 is No (No in S726b), the audit log writing unit 305 writes the content to be written to the audit log 800 received from the cooperation request processing unit 303 as it is (S726d).

On the other hand, in a case where the cooperation flag 402 is Yes (Yes in S726b), the audit log writing unit 305 converts the content to be written to the audit log 800 received from the cooperation request processing unit 303. That is, in the content to be written to the audit log 800, the user name 802 is converted into the cooperation source user name 403, and an operation source 803 is converted into the cooperation source system 101 (S726c). Thereafter, the audit log writing unit 305 writes the audit log 800 with the converted content (S726d). The audit log writing unit 305 performs the processing illustrated in the flow of FIG. 9 every time the content to be written to the audit log 800 is received from the cooperation request processing unit 303.

In the above operation flow, the operation from the cooperation source system 101 to the cooperation destination system 102 is converted to the audit log 122 of the cooperation destination system 102, the user name 802 is converted into the user name in the cooperation source system 101, and the operation source 803 is converted into the cooperation source system. As a result, it is possible to reduce the work of matching the UUID and the user name at the time of confirming the audit log 122 of the cooperation destination system 102.

Effects of First Embodiment

In the first embodiment described above, at the time of processing a request from the cooperation source system 101, a user name of the cooperation source system 101 included in the request is converted into a user ID (an ID of a cooperation user) of the cooperation destination system 102, and the request is processed. At the time of outputting the log during processing of the request, the ID of the cooperation user is converted into the user name of the cooperation source system 101 again, and the user name of the cooperation source system 101 is output to the log.

Therefore, according to the first embodiment, it is possible to store the operation performed by the cooperation source system 101 in the log of the cooperation destination system 102 with the user name of the cooperation source system 101, while avoiding overlapping of user names between the systems by using the cooperation user. Therefore, at the time of log audit, it is possible to confirm the unique user identification information such as the UUID and the user name of the cooperation source system 101 without matching the user identification information with the user name of the cooperation source system 101.

In addition, in the first embodiment, the log including the cooperation source user identification information converted from the user identification information and the cooperation source system identification information as the identification information of the request source system of the request is output. As a result, it is possible to determine the name of the cooperation source system 101 that has transmitted the request, on the log.

In the first embodiment, in a case where the cooperation source user name corresponding to the identification information of the user included in the request is not included in the cooperation destination system user information 121 when the request is received, the following processing is performed. That is, this identification information is used as the cooperation source user name, and the cooperation source user name and new user identification information are registered in the cooperation destination system user information 121 in association with each other. Furthermore, the identification information of the cooperation source system 101 included in the request may be associated and registered in the cooperation destination system user information 121. In particular, by using the UUID as the new user identification information, it is possible to easily create a cooperation user who avoids overlapping of the user names between the systems, and thus, it is possible to promote system cooperation.

Second Embodiment

Figure 10:
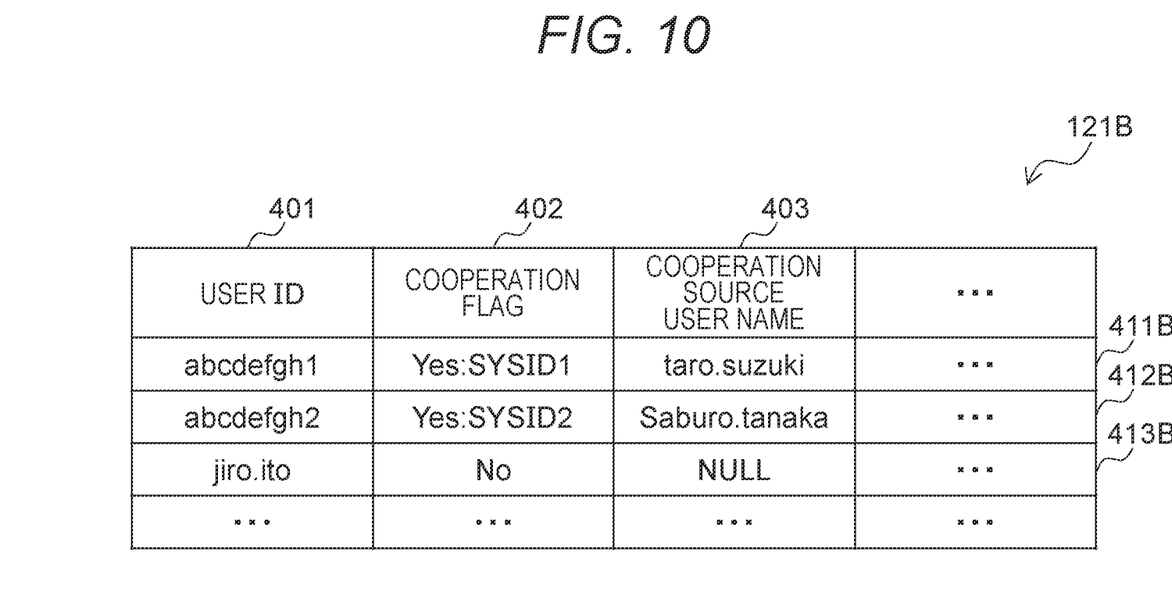
FIG. 10 is a diagram illustrating a configuration of cooperation destination system user information retained by a cooperation destination system according to a second embodiment.

In the first embodiment, in the cooperation system S, it is assumed that one cooperation source system 101 cooperates with one cooperation destination system 102. However, the present invention is not limited thereto. In a second embodiment, an example in which a plurality of cooperation source systems 101 cooperate with one cooperation destination system 102 in the cooperation system S will be described. Configuration of Cooperation Destination System User Information 121B According to Second Embodiment FIG. 10 is a diagram illustrating a configuration of cooperation destination system user information 121B retained by a cooperation destination system 102 according to the second embodiment.

The cooperation destination system user information 121B is different from the cooperation destination system user information 121 in the first embodiment in that an ID of a cooperation source system 101 (cooperation source system identification information) is stored together with "Yes" in the cooperation flag 402. The ID of the cooperation source system 101 may be any information that can uniquely identify the cooperation source system 101 in the cooperation system S.

A record 411B indicates that the cooperation user name (user ID 401) in the cooperation destination system 102 in which a user (cooperation source user name 403) of a system in which the cooperation source system 101 is identified by "SYS ID1" is "taro.suzuki" is "abcdefgh1". A record 412B indicates that the cooperation user name in the cooperation destination system 102 in which the user of the system in which the cooperation source system 101 is identified by "SYS ID2" is "Saburo.tanaka" is "abcdefgh2". The record 412B indicates that the user having the user ID 401 of "jiro.ito" is a unique user of the cooperation destination system 102.

In the second embodiment, in S713 of the request processing (FIG. 7) of the cooperation system S, the user name of the cooperation source system 101 and the ID of the cooperation source system 101 are added to the request, and the cooperation request is transmitted to the cooperation destination system 102.

In the second embodiment, in S722, the user ID 401 and the cooperation flag 402 of the cooperation destination system user information 121 are referred to based on the user name of the cooperation source system 101 and the ID of the cooperation source system 101 included in the cooperation request. Then, it is confirmed whether the cooperation user for the user corresponding to the combination of the user name of the cooperation source system 101 and the ID of the cooperation source system 101 is registered.

In the second embodiment, in S725, the cooperation response is transmitted to the system identified by the ID of the cooperation source system 101 indicated in the cooperation request received in S721.

In the second embodiment, in S726c of processing (FIG. 9) performed by the audit log writing unit 305 of the cooperation destination system 102, when the user name to be written to the audit log is converted into the user name of the cooperation source system, the operation source is converted into the ID of the cooperation source system 101. The ID of the cooperation source system 101 may be shared in advance between the cooperation source system 101 and the cooperation destination system 102 at the time of cooperation, or may be transmitted and received together with the cooperation request in S713 to S721 (FIG. 7).

In the second embodiment, in a case where the cooperation source user name corresponding to the identification information of the user included in the request is not included in the cooperation destination system user information 121B when the request is received, the following processing is performed. That is, this identification information is used as the cooperation source user name, and the cooperation source user name, new user identification information, and the identification information of the cooperation source system 101 included in the request are registered in the cooperation destination system user information 121B in association with each other. In particular, by using the UUID as the new user identification information, even in a case where a plurality of cooperation source systems 101 are provided, it is possible to easily create a cooperation user who avoids overlapping of the user names between the systems, and thus, it is possible to promote system cooperation.

Effects of Second Embodiment

In the second embodiment described above, in a case where there are a plurality of cooperation source systems 101, the log including the cooperation source user identification information and the cooperation source system identification information of the cooperation source system 101 among the plurality of cooperation source systems 101, as the identification information of the request source system of a request is output. Therefore, even in a case where a plurality of cooperation source systems 101 are provided, it is possible to determine which cooperation source system 101 has transmitted the request, on the log.

Although the embodiments according to the present disclosure have been described in detail above, the present disclosure is not limited to the above-described embodiments, and various modifications can be made without departing from the gist of the present disclosure. For example, the above-described embodiments have been described in detail in order to explain the present invention in an easy-to-understand manner, and the above-described embodiments are not necessarily limited to a case including all the described configurations. Regarding some components in the above-described embodiments, other components can be added, deleted, and replaced.

Some or all of the units, the configurations, the functional units, the processing units, and the like described above may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and a solid state drive (SSD), and a recording medium such as an IC card, an SD card, and a DVD.

In the above-described drawings, control lines and information lines considered necessary for the descriptions are illustrated, and not all the control lines and the information lines in the actual one are necessarily shown. For example, in practice, it may be considered that almost all components are connected to each other.

The above-described functions and data arrangement forms of the cooperation source system 101 and the cooperation destination system 102 are merely examples. The functions and the data arrangement forms can be changed to an optimum arrangement form from the viewpoint of performance of hardware and software, processing efficiency, communication efficiency, and the like.

What is claimed is:

1. An information processing system that cooperates with a cooperation source system to process a request received via the cooperation source system and a request received directly without the cooperation source system, the information processing system comprising:
    a processor; and
    a storage unit, wherein
    the storage unit stores user information for managing user identification information for uniquely identifying a user in the information processing system and cooperation source user identification information for identifying a cooperation source user in the cooperation source system in a case where the user is the cooperation source user in the cooperation source system in association with each other, and
    the processor is configured to
    receive the request,
    determine whether or not the cooperation source user identification information corresponding to identification information of a user included in the received request is included in the user information,
    convert the identification information into user identification information corresponding to the cooperation source user identification information in the user information, in a case where the cooperation source user identification information is included in the user information,
    process the request based on the user identification information,
    determine whether or not the cooperation source user identification information corresponding to the user identification information is included in the user information, when a log related to processing on the request is output,
    convert the user identification information into the cooperation source user identification information corresponding to the user identification information in the user information in a case where the cooperation source user identification information corresponding to the user identification information is included in the user information, and
    output the log including the cooperation source user identification information converted from the user identification information.

2. The information processing system according to claim 1, wherein
    the user information is provided for managing, in association with each other,
    the user identification information,
    the cooperation source user identification information for identifying the cooperation source user in the cooperation source system in a case where the user identified by the user identification information is the cooperation source user in the cooperation source system, and
    cooperation source system identification information for identifying the cooperation source system, and
    the processor is further configured to
    determine whether or not the cooperation source user identification information corresponding to the user identification information is included in the user information when the log is output,
    in a case where the cooperation source user identification information corresponding to the user identification information is included in the user information, convert the user identification information into the cooperation source user identification information corresponding to the user identification information in the user information, and convert identification information of a request source system of the request into the cooperation source system identification information associated with the cooperation source user identification information in the user information, and
    output the log including the cooperation source user identification information converted from the user identification information and the cooperation source system identification information as the identification information of the request source system.

3. The information processing system according to claim 1, wherein
    the processor is further configured to, in a case where the cooperation source user identification information corresponding to the identification information is not included in the user information when the request is received from the cooperation source system,
    associate the cooperation source user identification information and new user identification information with each other and register a result of the association as the cooperation source user identification information in the user information.

4. The information processing system according to claim 3, wherein
    the new user identification information is a universally unique identifier (UUID).

5. The information processing system according to claim 1, wherein
    the processor is further configured to process the request based on the user identification information included in the request when the request is received without the cooperation source system, and
output the log including the user identification information.

6. A log storage method in an information processing system that cooperates with a cooperation source system to process a request received via the cooperation source system and a request received directly without the cooperation source system, the information processing system including a processor and a storage unit, the method comprising:

by the storage unit, storing user information for managing user identification information for uniquely identifying a user in the information processing system and cooperation source user identification information for identifying a cooperation source user in the cooperation source system in a case where the user is the cooperation source user in the cooperation source system in association with each other; and by the processor, receiving the request;

determining whether or not the cooperation source user identification information corresponding to identification information of a user included in the received request is included in the user information;

converting the identification information into user identification information corresponding to the cooperation source user identification information in the user information, in a case where the cooperation source user identification information is included in the user information;

processing the request based on the user identification information;

determining whether or not the cooperation source user identification information corresponding to the user identification information is included in the user information, when a log related to processing on the request is output;

converting the user identification information into the cooperation source user identification information corresponding to the user identification information in the user information in a case where the cooperation source user identification information corresponding to the user identification information is included in the user information; and outputting the log including the cooperation source user identification information converted from the user identification information.

* * * * *